(12) United States Patent
Kavalakuntla (10) Patent No.: US 12,332,894 B2
(45) Date of Patent: Jun. 17, 2025

(54) QUERY RUNTIME FOR MULTI-LAYER COMPOSITION OF QUERIES

(71) Applicant: AMPERITY, INC., Seattle, WA (US)

(72) Inventor: Kailashnath Reddy Kavalakuntla, Apex, NC (US)

(73) Assignee: AMPERITY, INC., Seattle, WA (US)

( * ) Notice: Subject to any disclaimer, the term of this patent is extended or adjusted under 35 U.S.C. 154(b) by 0 days.

(21) Appl. No.: 18/462,762

(22) Filed: Sep. 7, 2023

(65) Prior Publication Data
US 2025/0086180 A1    Mar. 13, 2025

(51) Int. Cl.
*G06F 16/2453*    (2019.01)

(52) U.S. Cl.
CPC .. *G06F 16/24549* (2019.01); *G06F 16/24539* (2019.01)

(58) Field of Classification Search
CPC ............... G06F 16/2282; G06F 16/284; G06F 16/24522; G06F 16/24549; G06F 16/24539
USPC ........................................................ 707/717
See application file for complete search history.

(56) References Cited

U.S. PATENT DOCUMENTS

| | | | |
|---|---|---|---|
| 2004/0153435 A1* | 8/2004 | Gudbjartsson | G06F 16/284 |
| 2013/0060816 A1* | 3/2013 | Hui | G06F 16/86 |
| | | | 707/E17.098 |
| 2021/0173621 A1* | 6/2021 | Fender | G06F 8/71 |
| 2023/0385300 A1* | 11/2023 | Ash | G06F 16/215 |

* cited by examiner

*Primary Examiner* — Hung T Vy
(74) *Attorney, Agent, or Firm* — George David Zalepa; Greenberg Traurig, LLP (57) ABSTRACT

The present disclosure describes a system and method for optimizing SQL queries, specifically addressing challenges in handling and optimization of nested Common Table Expressions (CTEs). The system comprises a SQL optimization engine configured to receive SQL scripts from a SQL editor application and output optimized SQL to a query engine for execution on a database. The optimization engine utilizes three primary stages: a CTE normalization stage, a materialization stage, and a caching stage. The CTE normalization stage unnests nested CTEs into single-level CTEs. The materialization stage implements a materialized Create Table As Select (CTAS) strategy for materializing the base query. The caching stage enables reusability of the materialized base query across multiple queries, increasing efficiency and performance. This system provides technical solutions to enhance the capabilities of SQL engines that lack native support for nested CTEs, offering improved query performance and management of large datasets.

20 Claims, 6 Drawing Sheets

QUERY RUNTIME FOR MULTI-LAYER COMPOSITION OF QUERIES

BACKGROUND INFORMATION

Modern database management systems (DBMS) provide robust capabilities for data storage and retrieval. Many of these systems support Structured Query Language (SQL) for querying and managing data. SQL, with its rich functionality and flexibility, enables complex data manipulation and extraction, primarily through features like Common Table Expressions (CTE). However, not all SQL engines are created equal, and some of them do not support certain advanced functionalities, such as nested CTEs. Further, when using advanced SQL features such as CTEs, optimization can become a complex challenge. Specifically, materializing intermediate results during query execution can increase the performance but also leads to challenges such as increased runtime due to additional write operations and potential data duplication across multiple files. The lack of a system that can efficiently handle and optimize these features has created a significant gap in the database technology field. Therefore, there is a pressing need for an advanced, technical solution that addresses these issues and enhances the SQL querying capabilities of existing DBMS while ensuring the efficiency and performance of complex SQL scripts.

DETAILED DESCRIPTION

The present disclosure describes a system and method for optimizing SQL queries, specifically addressing challenges in handling and optimization of nested Common Table Expressions (CTEs). The system comprises a SQL optimization engine configured to receive SQL scripts from a SQL editor application and output optimized SQL to a query engine for execution on a database. The optimization engine utilizes three primary stages: a CTE normalization stage, a materialization stage, and a caching stage. The CTE normalization stage unnests nested CTEs into single-level CTEs. The materialization stage implements a materialized Create Table as Select (CTAS) strategy for materializing the base query. The caching stage enables reusability of the materialized base query across multiple queries, increasing efficiency and performance. This system provides technical solutions to enhance the capabilities of SQL engines that lack native support for nested CTEs, offering improved query performance and management of large datasets.

In some implementations, the techniques described herein relate to a method including: receiving a structured query language (SQL) script, the SQL script including a plurality of Common Table Expression (CTE) statements, the plurality of CTE statements including at least one nested CTE statement; flattening the plurality of CTE statements to generate a flattened SQL script; materializing at least one of the plurality of CTE statements to generate a materialized SQL script; and executing the materialized SQL script via a query engine.

In some implementations, the techniques described herein relate to a method, wherein flattening the plurality of CTE statements includes: parsing the SQL script to build a hierarchal representation of the SQL script; and traversing the hierarchal representation to flatten the CTE statements included in the SQL script.

In some implementations, the techniques described herein relate to a method, further including renaming one or more of the plurality of CTE statements.

In some implementations, the techniques described herein relate to a method, wherein renaming the one or more of the plurality of CTE statements includes renaming the one or more of the plurality of CTE statements upon detecting a name collision.

In some implementations, the techniques described herein relate to a method, wherein materializing at least one of the plurality of CTE statements includes analyzing names associated with the plurality of CTE statements to identify the at least one of the plurality of CTE statements to materialize.

In some implementations, the techniques described herein relate to a method, wherein analyzing names includes determining if a name of the at least one of the plurality of CTE statements includes a predefined prefix.

In some implementations, the techniques described herein relate to a method, wherein materializing at least one of the plurality of CTE statements includes converting the at least one of the plurality of CTE statements to a Create Table as Select (CTAS) statement.

In some implementations, the techniques described herein relate to a method, wherein executing the materialized SQL script via a query engine includes: identifying a base query in the SQL script; parking statements of the SQL script; materializing the base query; rewriting the statements of the SQL script to utilize the base query, creating an optimized SQL script; and executing the optimized SQL script via the query engine.

In some implementations, the techniques described herein relate to a non-transitory computer-readable storage medium for tangibly storing computer program instructions capable of being executed by a computer processor, the computer program instructions defining steps of: receiving a structured query language (SQL) script, the SQL script including a plurality of Common Table Expression (CTE) statements, the plurality of CTE statements including at least one nested CTE statement; flattening the plurality of CTE statements to generate a flattened SQL script; materializing at least one of the plurality of CTE statements to generate a materialized SQL script; and executing the materialized SQL script via a query engine.

In some implementations, the techniques described herein relate to a non-transitory computer-readable storage medium, wherein flattening the plurality of CTE statements includes: parsing the SQL script to build a hierarchal representation of the SQL script; and traversing the hierarchal representation to flatten the CTE statements included in the SQL script.

In some implementations, the techniques described herein relate to a non-transitory computer-readable storage medium, the steps further including renaming one or more of the plurality of CTE statements.

In some implementations, the techniques described herein relate to a non-transitory computer-readable storage medium, wherein renaming the one or more of the plurality of CTE statements includes renaming the one or more of the plurality of CTE statements upon detecting a name collision.

In some implementations, the techniques described herein relate to a non-transitory computer-readable storage medium, wherein materializing at least one of the plurality of CTE statements includes analyzing names associated with the plurality of CTE statements to identify the at least one of the plurality of CTE statements to materialize.

In some implementations, the techniques described herein relate to a non-transitory computer-readable storage medium, wherein analyzing names includes determining if a name of the at least one of the plurality of CTE statements includes a predefined prefix.

In some implementations, the techniques described herein relate to a non-transitory computer-readable storage medium, wherein materializing at least one of the plurality of CTE statements includes converting the at least one of the plurality of CTE statements to a Create Table as Select (CTAS) statement.

In some implementations, the techniques described herein relate to a non-transitory computer-readable storage medium, wherein executing the materialized SQL script via a query engine includes: identifying a base query in the SQL script; parking statements of the SQL script; materializing the base query; rewriting the statements of the SQL script to utilize the base query, creating an optimized SQL script; and executing the optimized SQL script via the query engine.

In some implementations, the techniques described herein relate to a device including: a processor; and a storage medium for tangibly storing thereon logic for execution by the processor, the logic including instructions for: receiving a structured query language (SQL) script, the SQL script including a plurality of Common Table Expression (CTE) statements, the plurality of CTE statements including at least one nested CTE statement, flattening the plurality of CTE statements to generate a flattened SQL script, materializing at least one of the plurality of CTE statements to generate a materialized SQL script, and executing the materialized SQL script via a query engine.

In some implementations, the techniques described herein relate to a device, wherein flattening the plurality of CTE statements includes: parsing the SQL script to build a hierarchal representation of the SQL script; traversing the hierarchal representation to flatten the CTE statements included in the SQL script; and renaming one or more of the plurality of CTE statements upon detecting a name collision.

In some implementations, the techniques described herein relate to a device, wherein materializing at least one of the plurality of CTE statements includes: analyzing names associated with the plurality of CTE statements to identify the at least one of the plurality of CTE statements to materialize upon determining that a name of the at least one of the plurality of CTE statements includes a predefined prefix; and converting the at least one of the plurality of CTE statements to a Create Table as Select (CTAS) statement.

In some implementations, the techniques described herein relate to a device, wherein executing the materialized SQL script via a query engine includes: identifying a base query in the SQL script; parking statements of the SQL script; materializing the base query; rewriting the statements of the SQL script to utilize the base query, creating an optimized SQL script; and executing the optimized SQL script via the query engine.

Figure 1:
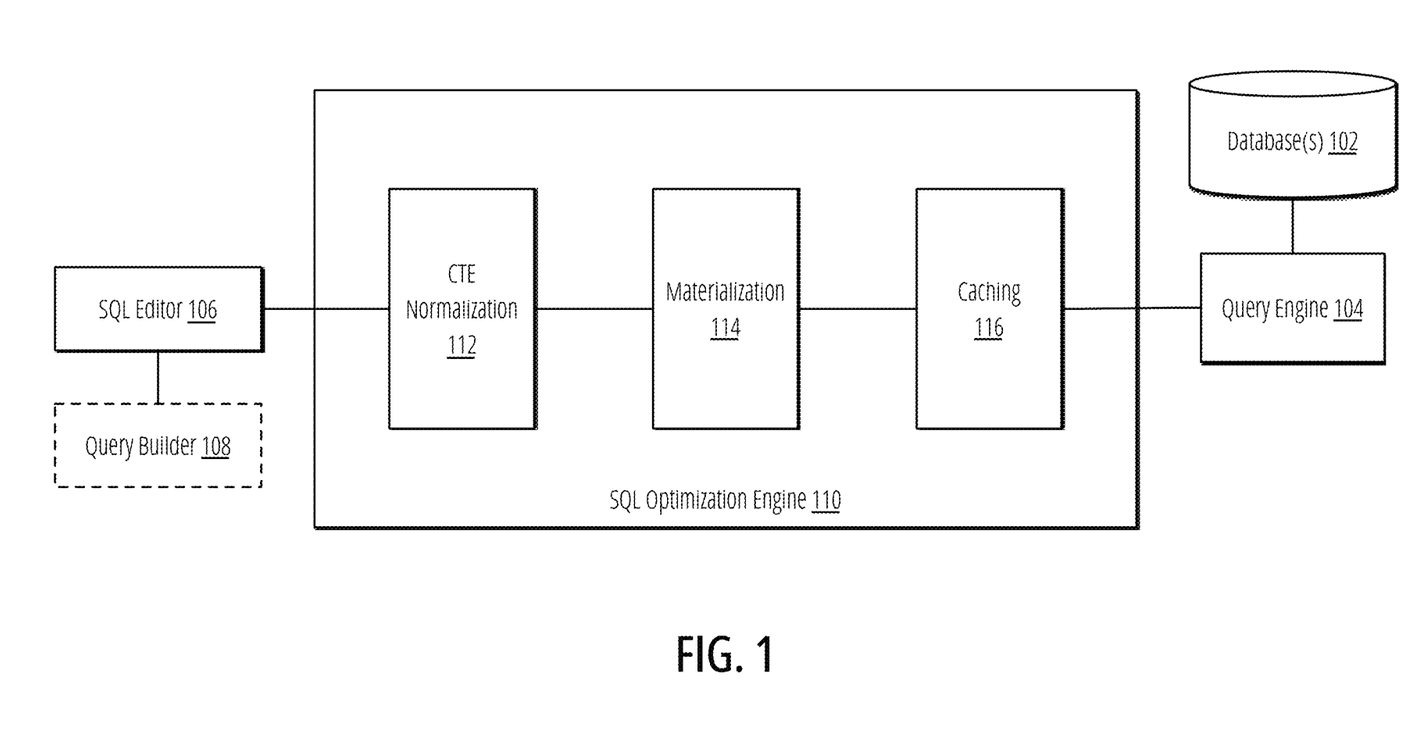
FIG. 1 is a block diagram illustrating a system for optimizing SQL queries according to some of the example embodiments.

FIG. 1 is a block diagram illustrating a system for optimizing SQL queries according to some of the example embodiments.

As illustrated, a SQL optimization engine 110 can be configured to receive SQL from an SQL editor application 106 and output optimized SQL to a query engine 104 for execution on one or more databases 102. In an optional embodiment, the SQL editor application 106 may receive SQL designed using a query builder 108, such as a web-based and/or graphical query building system. As illustrated, the SQL optimization includes three principal components: a CTE normalization stage 112, a materialization stage 114, and a caching stage 116. In the illustrated configuration, the CTE normalization stage 112 receives the SQL first, passes its output to the materialization stage 114 which parses the initially processed SQL, and passes its output to caching stage 116 which further processes the twice-processed SQL and outputs the final SQL to query engine 104. In some implementations, the order may be different. Further, in some implementations, the operations or CTE normalization stage 112, materialization stage 114, and caching stage 116 can be combined into a single processing stage. Specific functional details of CTE normalization stage 112, materialization stage 114, and caching stage 116 are described more fully in FIGS. 3 through 5, respectively, and are not repeated herein.

In some implementations, database 102 represents one or more structured data storage systems where the data for the SQL queries is stored and retrieved. For example, database 102 may be implemented as a relational database management system (RDBMS), a distributed database system, a NoSQL database, or any other type of database suitable for storing and managing large amounts of data. In some implementations, database 102 may include multiple databases (including different types) located on a single server or distributed across multiple servers in a network. These databases could be situated on-premises, in a cloud-based environment, or in a hybrid setup. Each database could be optimized for specific data models, such as tabular, document, key-value, graph, or wide-column, depending on the application requirements. The structure of database 102 can be designed to facilitate efficient data retrieval, enabling complex SQL queries to be executed and processed efficiently.

The query engine 104 is an essential component that interacts directly with database 102 to execute the SQL queries and retrieve the requested data. For example, the query engine could be a system such as PRESTOSQL®, a distributed SQL query engine designed to query data where it is stored, including APACHE® HIVE®, CASSANDRA®, relational databases, and even proprietary data stores. The query engine 104 is responsible for translating the SQL queries received from the SQL optimization engine 110 into operations that database 102 can understand and perform. This may involve parsing the SQL, optimizing the query for execution, and managing the resources used in the execution of the query. Depending on the complexity and nature of the query, the query engine might employ techniques like distributed processing or parallel execution to enhance the performance and reduce the execution time. This engine might be deployed on a standalone server or, in a distributed system, span multiple servers for added computing power.

The interface between database 102 and the query engine 104 could be a direct, high-speed network connection, facilitating fast and efficient data transfer. In a distributed environment, this connection might leverage a communication protocol such as TCP/IP for reliable data exchange. Additionally, drivers or adapters tailored to the specific type of database 102 might be employed to ensure accurate translation and execution of the SQL queries. This interface not only permits the exchange of data but also allows for the transmission of metadata, such as table schemas, indices, and other necessary database information.

SQL editor application 106 can be a headless server or service, e.g., cloud-based, capable of accepting, modifying, and managing SQL scripts. SQL editor application 106 may be driven entirely through API calls or similar mechanisms, meaning that it can receive SQL scripts, process them, and send them on to the next stage of the system without direct human interaction. In a cloud-based deployment, the SQL editor application 106 can be hosted on a server that can be scaled as needed to handle the required load. It might be built to operate in a distributed fashion, processing multiple SQL scripts in parallel to improve overall system throughput. Communication between the SQL editor application 106 and SQL optimization engine 110 would be via a secure interface, potentially an API.

The query builder 108 can encompass a diverse range of solutions aimed at aiding the user in generating SQL queries. This could include an Integrated Development Environment (IDE) plugin that provides auto-complete functionality, syntax highlighting, error checking, and other features to assist users in writing SQL scripts. For instance, a plugin for popular IDEs such as VISUAL STUDIO CODE® or INTELLIJ® could be implemented as query builder 108.

Alternatively, the query builder 108 could be a web-based interface for constructing SQL queries. This could range from a simple text editor with basic SQL editing capabilities to a more advanced, interactive solution that allows users to visually construct queries by dragging and dropping tables and fields, specifying relationships, filters, and other query parameters in a visual, user-friendly way.

Moreover, the query builder 108 could be an extension to a larger web-based application, such as a customer data platform (CDP), or other software suite. In this context, the query builder would allow end users to generate custom SQL queries to extract the precise information they need from the CDP's database. The query builder 108 could communicate with the SQL editor application 106 via API calls or similar mechanisms, transmitting the user-generated SQL scripts to the editor application for further processing and optimization.

Ultimately, SQL editor application 106 can provide the user-generated SQL to SQL optimization engine 110 for pre-processing before SQL optimization engine 110 outputs the final SQL to store and/or execute by query engine 104.

The SQL optimization engine 110 may be implemented as a software and/or hardware component that can be hosted on a variety of platforms. Depending on the specific implementation requirements, it could be set up on a dedicated server in a traditional on-premise data center environment, or it could be cloud-hosted using platforms. SQL optimization engine 110 could be built on a scalable architecture to handle varying workloads, and it might be containerized for easier deployment, scalability, and resilience, leveraging technologies such as DOCKER® and KUBERNETES®. SQL optimization engine 110 could be developed using a combination of high-level and low-level programming languages, with language selection dependent on specific performance and functionality requirements. For instance, languages like PYTHON® or JAVA® could be employed for high-level logic, while C++® or RUST® might be used for performance-critical components.

SQL optimization engine 110 communicates with the SQL editor application 106, receiving the SQL scripts and performing the necessary optimization routines, such as CTE normalization, query materialization, and caching, described next.

Figure 2:
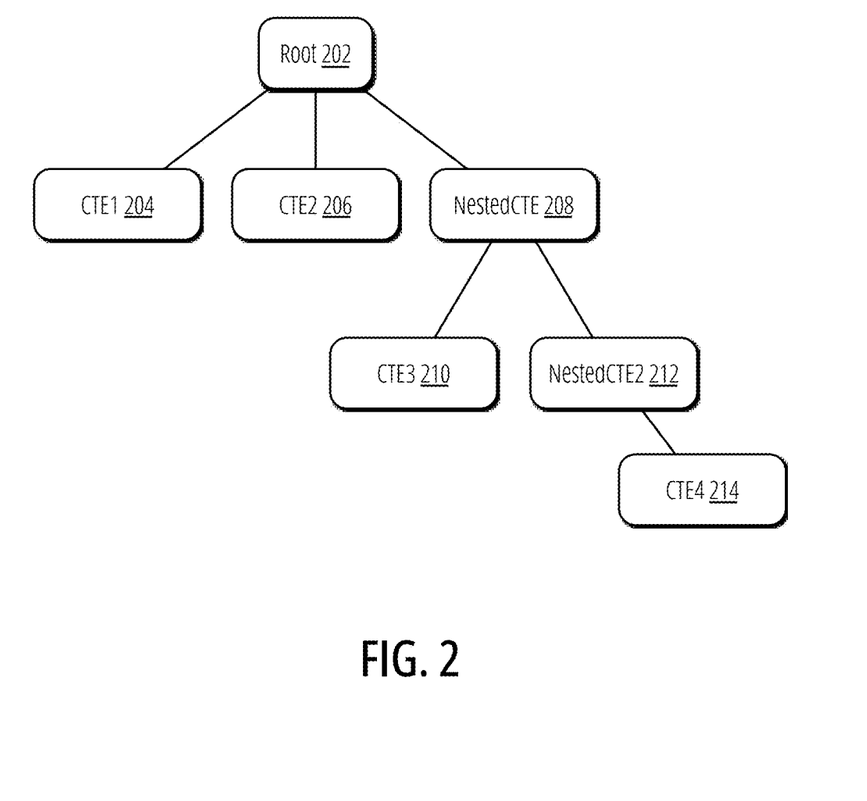
FIG. 2 illustrates a tree data structure representative of an SQL script containing multiple CTEs.

FIG. 2 illustrates a tree data structure representative of an SQL script containing multiple CTEs.

The tree visualization provides an organized and systematic approach to understanding the hierarchical relationships and dependencies between different CTEs, including those nested within other CTEs. As can be discerned from the figure, the data structure takes the form of a rooted tree with each node representing a distinct CTE or a nested CTE group.

The root of this tree, root node 202, denotes the overall script context, from which all the CTEs and nested CTEs stem. From this root, three immediate child nodes branch out, representing the first layer of CTEs in the script. These nodes are identified as CTE1 204, CTE2 206, and NestedCTE 208.

CTE1 204 and CTE2 206 are standalone nodes, each representing a distinct CTE in the SQL script. The nodes encapsulate individual CTEs that are directly linked to the overall script without any nested dependencies. They exist at the first hierarchical level of the tree, directly under the root.

NestedCTE 208, unlike CTE1 204 and CTE2 206, represents a complex CTE that includes other nested CTEs within its scope. It is a node that encapsulates a group of interconnected CTEs, indicative of its label as a "nested" CTE. This node constitutes the first level of nesting within the SQL script and serves as the parent node for other CTEs nested within it.

Nested within NestedCTE 208 are two more nodes, CTE3 210 and NestedCTE2 212. CTE3 210 represents a standalone CTE within the scope of NestedCTE 208. It is not further nested and exists at the second hierarchical level of the tree. On the other hand, NestedCTE2 212 denotes another layer of nested CTEs, similar to NestedCTE 208 but existing within its scope. This node represents the second level of nesting within the SQL script and marks the presence of even more complex relationships within the code.

Finally, within the scope of NestedCTE2 212, a single node labeled CTE4 214 exists. This node represents a standalone CTE at the third hierarchical level of the tree, marking the deepest level of nesting within this SQL script.

The structure of this tree in FIG. 2 illustrates the intricate nature of nested CTEs within an SQL script. Each node signifies a different CTE or a group of CTEs, with the hierarchical links demonstrating the nesting levels and dependencies between them. This structure is used for parsing, analyzing, and ultimately flattening these CTEs, a process further elucidated in FIG. 3.

Figure 3:
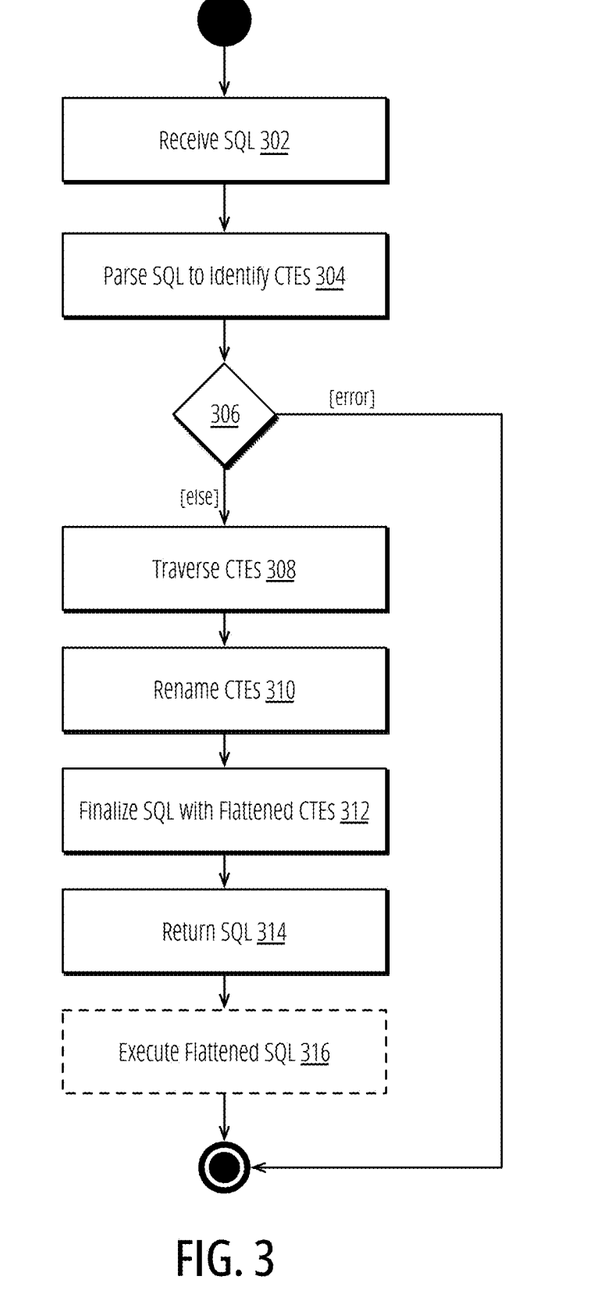
FIG. 3 is a flow diagram illustrating a method for flattening an SQL script that includes nested common table expressions.

FIG. 3 is a flow diagram illustrating a method for flattening an SQL script that includes nested common table expressions.

In step 302, the method can include receiving an SQL script.

SQL is a specialized language utilized for interacting with relational databases. It's designed to handle data in such databases, including querying, insertion, updating, and management of data. In this step, the method obtains a sequence of SQL statements that are designed to manipulate and retrieve data from a database system. This could be facilitated in a variety of ways, including direct user input, a database management system, or sourced from a file or code repository storing the script. In some implementations, a graphical or text front-end can be deployed to receive SQL scripts from users. For example, a web-based graphical user interface can allow users to design SQL scripts as text, graphically, or in any other suitable format. In some implementations, however, the representation will be converted to a text-based SQL script for processing by the method.

The received SQL script can include nested CTEs. CTEs serve as temporary result sets that are defined within the scope of an SQL statement such as SELECT, INSERT, UPDATE, DELETE, or CREATE VIEW. These CTEs can significantly streamline the development of complex queries as they can refer to themselves, which enables the creation of recursive queries. However, as discussed in FIG. 1, certain query engines may not natively support nested CTEs in SQL. As such, attempts to run an SQL script that includes nested CTEs would fail with such query engines, rendering the SQL useless.

In step 304, the method can include parsing the SQL script to identify all CTEs within an SQL script. In some implementations, step 304 can include building a tree structure or similar structure to arrange the CTEs (including nested CTEs) as well as other components of an SQL script.

In implementing step 304, the method may comprise utilizing a parser specifically tailored to analyze and interpret SQL scripts. In some implementations, this parser can discern and single out CTEs within the provided SQL script. The design of the parser may utilize lexical and syntax analysis techniques. Lexical analysis can be utilized to tokenize the SQL script, partitioning the content into lexical units, while syntax analysis can apply specific grammar rules to comprehend the overall structure of the script. The construction of the parser may leverage various extant parsing libraries, which are accessible in diverse programming languages, including but not limited to PYTHON® and JAVA® For instance, ANTL® (Another Tool for Language Recognition) may be employed as a powerful tool to generate the parser required for the process.

Following the successful identification of the CTEs through the parsing process, the method can build a tree structure to encapsulate the hierarchical relationships among the recognized CTEs, including nested CTEs, and other components in the SQL script. The implementation of this tree structure provides a structural representation of the SQL script, thereby facilitating subsequent steps of manipulation and transformation as will be discussed. Each node in this tree may correspond to individual CTEs and SQL components, while the edges may signify dependencies and nested relationships between them.

The formation of the tree structure may involve the initiation with a root node, followed by the addition of child nodes as each CTE or SQL component is processed by the parser. This process is performed recursively, allowing each nested CTE to be a child node in the tree, accurately representing the hierarchical structure of the SQL script. The tree structure, therefore, serves as a map of the entire SQL script, allowing for precise and efficient further processing.

In step 306, the method determines if any errors were raised during parsing of the SQL script. If so, the method may end. If an error was detected, the method may determine that the SQL script is malformed or contains other issues preventing it from being executed. Thus, the method may preemptively end and, in some implementations, provide details to the user regarding the errors detected during parsing. In some implementations, the errors may include an error raised by an excessively nested CTE (e.g., a CTE nested n or more levels where a threshold is set as n-1), although, in some implementations, no limit is placed on the nesting level. If, however, no errors were raised, the method proceeds to step 308.

In step 308, the method traverses the CTEs identified by the parser. In some implementations, the method utilizes a graph traversal algorithm to traverse the CTEs in the tree representation of the script. In some implementations, the method can utilize any graph traversal algorithm that can provide an ordered representations of the nesting of the CTEs for later flattening. For example, a topological sort algorithm or modified depth-first search can be used. In some implementations, the choice of algorithm is not limiting, however it should be selected such that the CTEs can be flattened into an un-nested list while maintaining consistency with internal references among CTEs.

In step 308, the method processes the identified CTEs from the SQL script. This process, often termed "traversal," is a structured exploration of the tree representation built from the SQL script. The traversal is important as it enables the positioning of each CTE in the context of the entire script, thereby setting the stage for the flattening operations that follow. The execution of this traversal can be achieved through the implementation of a graph traversal algorithm to navigate the nodes of the tree in a systematic, orderly fashion. A characteristic of the chosen algorithm in this scenario is its ability to provide an ordered representation of the nested CTEs. This order ensures that upon flattening, the internal references among CTEs are preserved, thereby maintaining the integrity of the SQL script's structure.

As mentioned, the selection of a suitable graph traversal algorithm can depend on multiple factors. However, the algorithm should manage the dependencies and hierarchical relationships within the SQL script. As discussed, a topological sort algorithm or a modified depth-first search (DFS) algorithm may be employed in some implementations. A DFS algorithm, for instance, explores as far as possible along each branch before backtracking, which can be beneficial in this context as it ensures that all nodes or 'children' of a CTE (nested CTEs) are processed before the CTE itself. This feature may be important for maintaining the internal references among CTEs during the flattening process. While the selection of a specific algorithm may vary based on the specific implementation, it is essential to note that the choice should be guided by the principle of maintaining the SQL script's structural consistency. Regardless of the algorithm chosen, the purpose remains the same: to achieve a flattened, un-nested list of CTEs that preserve their internal references and dependencies. The traversal process, in essence, ensures that the integrity and the logical flow of the original SQL script are maintained even after the transformation.

To illustrate the application of a topological sort algorithm in the context of the described tree structure, consider the following example using the tree of FIG. 2. A topological sort algorithm can be applied to this tree structure in order to generate an ordered list of CTEs, while preserving their dependencies. The process can be carried out in the following steps.

First, the algorithm starts from the root node 202, recognizing it as the highest node in the hierarchy. As there are no incoming edges to the root, it will be the first node processed by the algorithm.

The algorithm then moves on to the first depth level. It identifies CTE1 204, CTE2 206, and NestedCTE 208, as these are directly connected to the root. The algorithm processes these nodes in the order of their appearance, adding them to the ordered list.

Moving to the next depth level, the algorithm identifies CTE3 210 and NestedCTE2 212. Both of these nodes are connected to NestedCTE 208 from the previous depth level. Importantly, the algorithm takes into account the dependencies and processes NestedCTE2 212 after CTE3 210, since NestedCTE2 212 has a dependency on CTE3 210.

Finally, the algorithm reaches the last depth level and processes CTE4 214, which is connected to NestedCTE2 212 from the previous depth level.

As a result of the topological sort algorithm, the final ordered list of CTEs would be root node 202, CTE1 204, CTE2 206, NestedCTE 208, CTE3 210, NestedCTE2 212, and CTE4 214. This ordered list effectively flattens the nested structure of the CTEs, while also preserving the dependencies and relationships between them. This is crucial as it ensures that the final, flattened SQL script maintains the integrity and logic of the original script. As discussed, in other implementations, if a DFS algorithm is used, the visited node list can be reversed after completion to obtain the flattened list of CTEs.

In step 310, the method can include renaming the CTEs from their original names included in the SQL script to a contextual name based on their ordering.

In some implementations, nested CTEs may have the same names as parent CTEs in the same script. Thus, in the ordered list above "CTE1" and "CTE3" may have the same name, thus presenting duplicate named CTEs. Such duplication of names is illegal in standard SQL sequence. Thus, in step 310, the method can proactive rename each of the CTEs to avoid such collisions caused by the flattening. In some implementations, the method can only rename conflicting names, while in other implementations, the method can rename all CTEs.

As one example, the method can attach an order number to each of the conflicting names (i.e., the CTEs position in the ordered list of CTEs) to avoid naming conflicts. Certainly, other techniques can be used provided that no two or more CTEs have identical names.

In step 312, the method can include finalizing the SQL script using the flattened CTEs. In some implementations, the method combines the CTE list with any other non-CTE statements or commands in the SQL script to generate the flattened SQL script. In some implementations, the method can parse the script to ensure there are no errors prior to returning. In some implementations, step 312 can include placing the CTEs at the start of the script and placing all remaining statements after the flattened CTE list.

In step 312, the method encompasses the integration of the flattened list of CTEs into the final SQL script. This process effectively unifies the outcome of the preceding stages where CTEs have been parsed, ordered, and renamed.

The construction of the final SQL script involves integrating the structured list of CTEs with the remaining SQL statements or commands, which are not classified as CTEs, from the original script. This synthesis forms a cohesive SQL script that maintains the function of the original, while concurrently simplifying the script structure by flattening nested CTEs.

An aspect of this step can be the validation of the final SQL script. This might involve an additional parsing step to ensure that the script is syntactically correct, and that it adheres to SQL standards. By conducting this validation prior to the execution of the script, potential execution errors can be pre-emptively identified and addressed, improving the reliability of the process.

Structuring the final SQL script is another consideration during this step. In specific, the method might arrange the CTEs at the beginning of the script, followed by the remaining SQL statements. This arrangement ensures the proper sequence of SQL operations, particularly in the event where the SQL statements refer to the CTEs. As such, placing the CTEs at the beginning of the script guarantees that all CTE declarations are processed before any statements that might refer to them, thereby preserving the logical flow and integrity of the original script.

In some implementations, the method can then pass the parsed SQL script to another processing stage, such as the materialization stage described in FIG. 1. Alternatively, or in conjunction with the foregoing, the method can (in optional step 316) execute the flattened SQL script at the query engine. In some implementations, step 316 can be implemented in lieu of further processing if so desired or specified by the user, and the specific timing of execution is not limiting.

As illustrated in the above method, the method offers a technical enhancement that enables the usage of nested CTEs in query engines that traditionally do not support this feature. Through this computational approach, the method can restructure SQL scripts to circumvent the lack of built-in nested CTE support, thereby creating an effective bridge between user-friendly SQL scripting and the underlying query engine's operations. Consequently, the method broadens the scope of SQL scripts that can be processed, providing the flexibility, simplicity, and convenience of nested CTEs in environments where they were previously incompatible.

Figure 4:
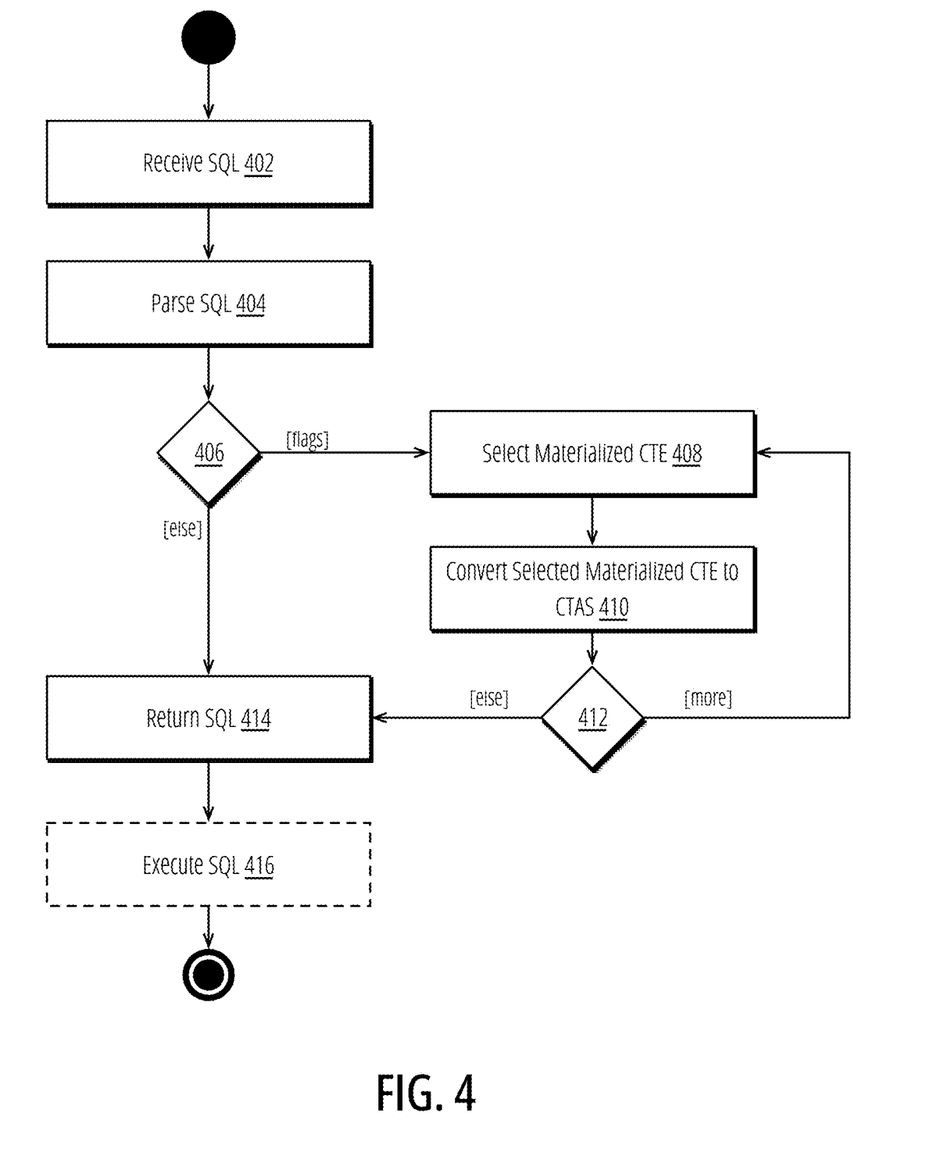
FIG. 4 is a flow diagram illustrating a method for materializing an SQL script according to some of the example embodiments.

FIG. 4 is a flow diagram illustrating a method for materializing an SQL script according to some of the example embodiments.

In step 402, the method can include receiving an SQL script. In some implementations, the SQL script can comprise a new SQL script or may comprise the SQL script processed using the method of FIG. 3.

In step 402, the method begins with the receiving of an SQL script. This script could originate from multiple sources. For example, it may be input directly by a database administrator, passed in from an application or system that generates SQL scripts (e.g., a user-facing script builder), or imported from an external file or database. The SQL script received might be a completely new script or it could be a result of preprocessing from a prior stage, such as the result of the processing detailed in FIG. 3.

In some implementations, the SQL script received at this stage can contain a combination of different SQL statements. This includes, but is not limited to, Data Definition Language (DDL) statements like CREATE, ALTER, and DROP; Data Manipulation Language (DML) statements like SELECT, INSERT, UPDATE, and DELETE; and Data Control Language (DCL) statements like GRANT and REVOKE. The script may also contain Control-of-Flow Language statements such as BEGIN . . . END, IF . . . ELSE, and WHILE.

As discussed previously, the received SQL script may include CTEs. A CTE is generally defined at the beginning of a query, and it can be followed by a single SQL statement that can refer to the CTE by name as if it was an actual table. A CTE exists only for the duration of the query and is not stored for future use. Nested CTEs take this a step further by defining CTEs within other CTEs, enabling the development of deeply nested, intricate query structures. This allows for powerful query designs where the results of one CTE can be used as the basis for another, thereby creating a multilayered, hierarchical query structure. Such structures can be extremely effective for certain complex query requirements but could also increase the computational load and reduce the performance of the query engine, especially for large data sets.

Additionally, the SQL script may contain statements or parts of statements that are flagged for materialization. These could be recognized by certain predefined keywords or phrases, which would act as a directive to the method to treat these portions of the script differently in later stages. The received SQL script could include CTE names that are prefixed with a specific term, such as "materialized_," to indicate that they are candidates for materialization. When the method identifies a CTE with this prefix, it will interpret this as an instruction to convert this CTE into a more permanent structure such as materializing it into a physical table on the disk (as will be discussed). This improves the execution performance of large and complex queries, particularly those that are executed frequently or those that handle substantial data volumes. By materializing the CTE, the system is able to reuse the result set without having to re-compute it each time the query is run.

In step 404, the method can include parsing the SQL script to identify any statements flagged for materialization.

In some implementations, the method can use a parser to traverse the SQL script and identify CTEs that are marked for materialization. This could be achieved through various approaches in natural language processing and string analysis.

In some implementations, the parser could use lexical analysis, where it breaks down the script into individual words or tokens. Lexical analysis would allow the system to process and categorize each part of the SQL script separately. Each token could then be compared to a list of reserved SQL keywords, such as "WITH", "AS", and "SELECT", to identify the structure of the script and locate CTEs. To detect CTEs that are marked for materialization, the parser could look for CTE definitions that begin with the specific prefix (e.g., "materialized_"). This could be done by comparing the first few characters of each CTE name with this prefix. In order to accurately and efficiently identify the materialized CTEs, the parser could be designed to consider the syntax and context of the SQL script. For example, it could identify the start of a CTE by locating the keyword "WITH", followed by the CTE name, which in the case of materialized CTEs, would start with the "materialized_" prefix.

Additionally, the parser could be designed to account for nested CTEs, keeping track of the nesting level of each CTE it encounters. This could be accomplished by using a data structure such as a stack to track the current level of nesting. When the parser encounters a new "WITH" keyword, it could increment the nesting level, and when it encounters a closing parenthesis marking the end of a CTE, it could decrement the nesting level. It's worth noting that this parsing process can also be seen as constructing a tree representation of the SQL script, similar to what was discussed in reference to FIG. 2. Each CTE can be viewed as a node in the tree, with parent-child relationships representing nesting of CTEs in the script. The root of the tree could represent the main script, with the first-level child nodes representing the top-level CTEs. Further nesting levels in the script would correspond to deeper levels in the tree. The "materialized_" flagged CTEs could be seen as specific nodes marked for a particular type of processing, in this case, materialization.

In step 406, the method can include determining if any flagged statements are present. If not, the method returns the SQL script, unchanged in step 414. By contrast, if any flagged statements are detected, the method can proceed to step 408.

In step 408, the method can include selecting a materialized CTE flagged in the SQL script.

In this step, the method focuses on individual flagged CTEs identified in the previous step, selecting one for conversion into a materialized view. Here, the tree structure described earlier may be used. Depending on the implementation, the method might start with either a depth-first or breadth-first traversal of the tree. For instance, the method may first select the "materialized_" CTEs that are in the deepest level of the tree (i.e., nested most heavily), or it may first select the ones that appear first in a left-to-right reading of the script. In some implementations, a queue or stack data structure can be used to keep track of the "materialized_" CTEs that have been identified but not yet processed. The method can dequeue or pop one "materialized_" CTE at a time from this data structure for processing, ensuring a systematic handling of each flagged CTE.

In addition to the structural information, the method also collects relevant details associated with the selected CTE, such as the CTE's SQL statement, any dependent CTEs, and any CTEs on which it depends. These details will be used in the subsequent steps to properly construct the CTAS statement and to maintain the integrity of the script's logic during the conversion process.

When a CTE is flagged with "materialized_", the method not just materializes that specific CTE but also all its dependencies. This is because the CTE flagged for materialization can be reliant on previous CTEs for its computation. The flag "materialized_" may serve as a checkpoint in the SQL script, suggesting that all computations up to this point need to be stored for future use. This can be achieved by transforming the associated part of the query into a CTAS (or equivalent) statement, effectively creating a materialized view. Therefore, the flagged statement can provide a partition in the SQL script, dividing it into a section to be materialized and a section to proceed with the given computations. This approach can be particularly useful when dealing with complex, nested CTEs and large datasets, as it can significantly reduce computational overhead and enhance query performance.

In step 410, the method can include converting the materialized CTE selected in step 408 to a new statement such as a CREATE TABLE AS SELECT (CTAS) statement.

For step 410, once a materialized CTE is selected, the method can transform this portion of the SQL script into a CTAS statement or an equivalent materialization statement in the output SQL dialect. This step essentially converts the flagged CTE into a physical table in the database, effectively materializing the query up to this point. In this step, the CTAS statement's table name can be auto-generated to ensure uniqueness, such as appending a UUID or timestamp. Once the CTAS statement is constructed, it replaces the original materialized CTE in the SQL script. This operation can be conducted recursively if multiple materialized CTEs are flagged.

In step 412, the method can include determining if any other materialized CTEs exist. If so, the method repeats step 408 and step 410 for each remaining materialized CTE statement. If not, the method proceeds to step 414.

In step 414, the method returns the SQL script including any processed materialized CTEs. In some implementations, the method can then pass the parsed SQL script to another processing stage, such as the caching stage described in FIG. 1. Alternatively, or in conjunction with the foregoing, the method can (in optional step 416) execute the SQL script at the query engine. In some implementations, step 416 can be implemented in lieu of further processing if so desired or specified by the user, and the specific timing of execution is not limiting. Details of step 414 and step 416 are similar to that of step 314 and step 316 of FIG. 3.

Through the outlined method, a technical solution is offered that enhances the functionality and performance of a query engine, allowing it to effectively handle and materialize complex SQL scripts, even those involving deeply nested CTEs. This computational approach, facilitated by unique parsing and processing techniques, optimizes large, intricate queries by breaking them down into more manageable components. By doing so, the execution speed is significantly improved, particularly for queries that are run repeatedly and could benefit from being materialized at various stages. This technical mechanism provides a significant upgrade to traditional SQL database interaction, driving efficient resource utilization and fostering improved database operation for handling complex data manipulations.

Figure 5:
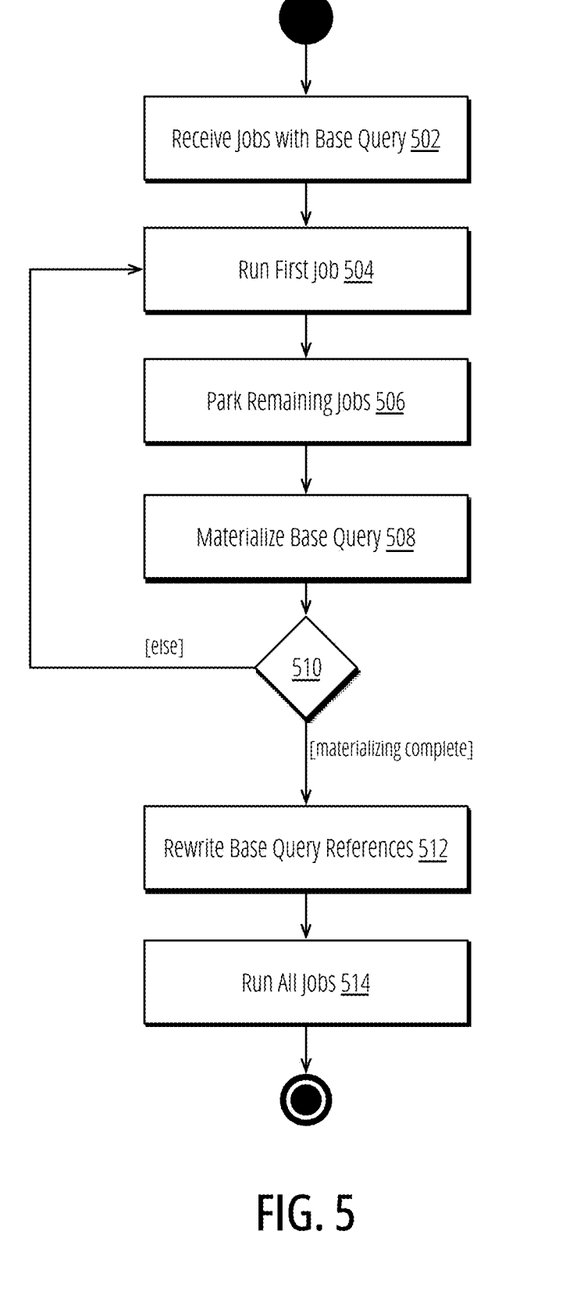
FIG. 5 is a method illustrating a caching mechanism for SQL scripts according to some of the example embodiments.

FIG. 5 is a method illustrating a caching mechanism for SQL scripts according to some of the example embodiments.

In step 502, the method can include receiving jobs (e.g., SQL statements) that include a base query.

In this step, the method can include receiving jobs. In some implementations, a job can represent an SQL statement or a collection of SQL statements that are to be executed. The jobs can be submitted to the query engine in the form of an SQL script, as part of a larger software system, or via a user interface. The jobs can be grouped according to their logical dependencies or their use of a common base query. In some implementations, the jobs can be related by their dependence on a particular base query. For example, they can all involve calculations or selections from a subset of a customer database, such as all customers who live in a certain city.

In the context of the SQL language, a "base query" may refer to a foundational part of an SQL statement or script from which other statements or scripts are derived. A base query can serve as a common part of multiple different queries, such as a filtering operation that selects a subset of data that is relevant to a series of analyses. The base query can be written as a CTE, or it can be part of a subquery within a larger SQL statement.

The method can receive the jobs all at once, or they can be received over time. They can be prioritized or scheduled according to various criteria, such as the order in which they were received, the estimated runtime, the priority level assigned by a user or system, or their dependencies on other jobs or data. The jobs can be received from multiple different users or systems, and they can be run on the same or different database instances. In some implementations, the method may also include validating, formatting, or preprocessing the jobs in some way before they are further processed.

In step 504, the method can include running a first job from the jobs.

In this step, the method can initiate the execution of a first job from the collection of received jobs. This job might be selected based on various factors such as its priority, its dependencies, the order in which it was received, or the order specified by the user or system. The selected job is then run on the query engine.

During the running of the job, the state of the job is tracked and updated in a job management system. This might include the progress of the job, the results of the job, and any errors or issues that arise. The job management system can also handle the distribution of the job's tasks across multiple processing units or servers, the scheduling of the job's tasks, and the recovery from any failures or interruptions.

The selected job begins execution on the SQL engine. The execution of the job includes processing the SQL statements that constitute the job. If the job contains a base query, that base query is identified and executed first. However, if this base query is prefixed with "materialized_" as discussed in previous sections, indicating the need for materialization, the job gets "parked" or paused. In the context of this method, an SQL statement or job being "parked" refers to the process of temporarily suspending its execution. This is achieved by the system maintaining a state or a flag for each job, indicating whether the job is active, parked, or completed, allowing the system to control when and how the job's execution proceeds or pauses.

The parking of the job happens because materialization requires the base query to be executed and its results stored as a new table in the database before the rest of the job can proceed. This necessity to pause comes from the need to ensure the results of the base query are available and consistent for all subsequent steps in the job or other jobs that depend on this base query.

In essence, this step involves the commencement of a job that includes a base query and pausing that job when it is identified that the base query needs materialization, effectively parking the job until materialization of the base query is completed.

In step 506, the method can include "parking" the other jobs in the received jobs.

In this step, the method involves parking the remaining jobs that have not been selected for execution in step 504. This could be implemented as simply setting a "parked" status for these jobs in a job queue or a job control module. The parking of jobs allows the system to prevent unnecessary re-executions or duplications of the base query while it is being materialized. This contributes to the efficiency of the system by conserving computational resources and reducing the overall processing time.

In step 508, the method can include materializing a base query include in the jobs.

In this step, the method includes materializing the base query that was detected and paused during the execution of the first job in step 504. To materialize the base query, the system may follow the method as described in FIG. 4, converting the base CTE into a CTAS (or similar) statement, which stores the base query's results in a new table. This materialized table serves as a cache of the base query's results and can be referred to by subsequent jobs. This step highlights the integration of the SQL script processing method with the caching mechanism to optimize the efficiency of executing a collection of related SQL statements.

In step 510, the method can include waiting for the base query to materialize. If it has not yet materialized, the method returns to step 504. Once the base query materializes, the method proceeds to step 512.

In step 512, the method can include rewriting all base query references in all the jobs. Once the base query has been materialized into a table as per step 508, the references to the base query in all the parked jobs (from step 506) can now be replaced with the newly created materialized table.

In some implementations, the rewrite process involves identifying the specific syntax or keyword in the SQL statement that refers to the base query and replacing it with a reference to the materialized table. This ensures that the base query's results, now held in the materialized table, are utilized rather than re-running the base query.

This process optimizes the overall performance as the query results are already computed and stored, preventing the need to execute the same base query again for each job. The replacement is done programmatically using string or regular expression operations or by using a parser that understands the syntax and structure of SQL scripts.

For example, in a SQL statement like "WITH BASE AS (select*from customers where city='seattle')", where BASE is the identified base query to be materialized, it could be rewritten as "WITH BASE AS (select*from materialized_f34de)", where "materialized_f34de" is the table resulting from the materialization of the base query. This rewritten SQL statement now refers to the materialized table instead of the original base query.

This approach of rewriting allows for efficient use of computational resources by reusing the results of the materialized base query across multiple SQL statements or jobs.

In step 514, the method can include running all jobs (either in parallel or in sequence). Upon successful rewriting of all SQL scripts to refer to the materialized base query (as done in step 512), the parked jobs can be unparked and executed. The jobs could be run in parallel or in sequence, depending on the system's capacity and configurations. In some implementations, a job scheduler or a task executor could be used to handle the execution of the jobs. The scheduler or executor ensures that each job runs to completion, handling any errors or exceptions that might occur during the execution of the jobs, and providing feedback on the job status. This allows the system to efficiently process multiple jobs that depend on the same base query, leveraging the materialized results to improve query performance.

Figure 6:
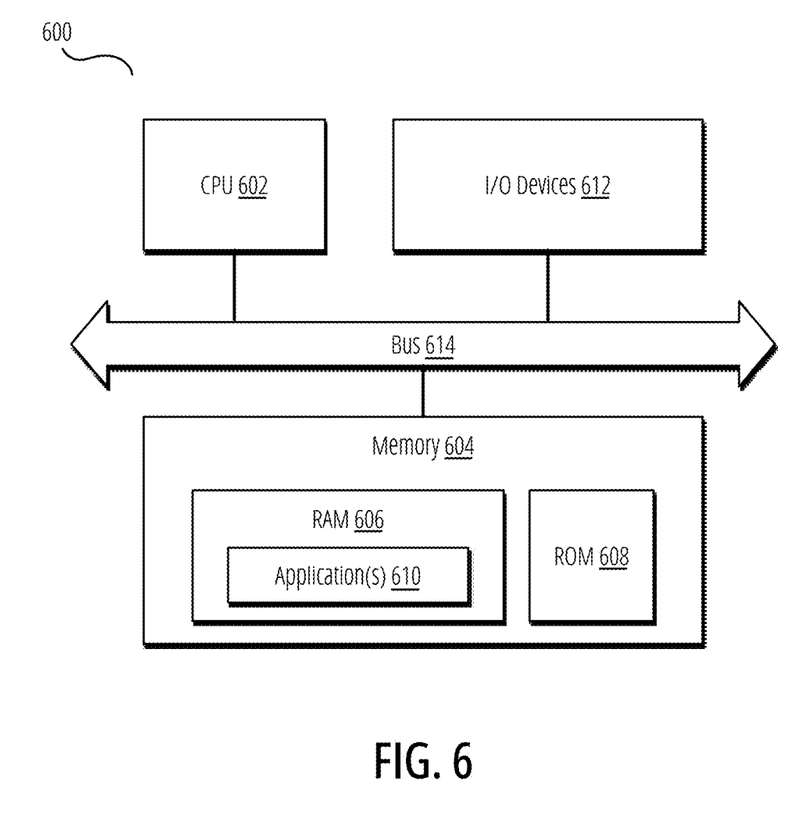
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

I claim:

1. A method comprising:
   receiving a structured query language (SQL) script, the SQL script including a plurality of Common Table Expression (CTE) statements, the plurality of CTE statements including at least one nested CTE statement;
   flattening the plurality of CTE statements to generate a flattened SQL script;
   materializing at least one of the plurality of CTE statements to generate a materialized SQL script; and
   executing the materialized SQL script via a query engine.

2. The method of claim 1, wherein flattening the plurality of CTE statements comprises:
   parsing the SQL script to build a hierarchal representation of the SQL script; and
   traversing the hierarchal representation to flatten the CTE statements included in the SQL script.

3. The method of claim 2, further comprising renaming one or more of the plurality of CTE statements.

4. The method of claim 3, wherein renaming the one or more of the plurality of CTE statements comprises renaming the one or more of the plurality of CTE statements upon detecting a name collision.

5. The method of claim 1, wherein materializing at least one of the plurality of CTE statements comprises analyzing names associated with the plurality of CTE statements to identify the at least one of the plurality of CTE statements to materialize.

6. The method of claim 5, wherein analyzing names comprises determining if a name of the at least one of the plurality of CTE statements includes a predefined prefix.

7. The method of claim 1, wherein materializing at least one of the plurality of CTE statements comprises converting the at least one of the plurality of CTE statements to a Create Table as Select (CTAS) statement.

8. The method of claim 1, wherein executing the materialized SQL script via a query engine comprises:
   identifying a base query in the SQL script;
   parking statements of the SQL script;
   materializing the base query;
   rewriting the statements of the SQL script to utilize the base query, creating an optimized SQL script; and
   executing the optimized SQL script via the query engine.

9. A non-transitory computer-readable storage medium for tangibly storing computer program instructions capable of being executed by a computer processor, the computer program instructions defining steps of:
   receiving a structured query language (SQL) script, the SQL script including a plurality of Common Table Expression (CTE) statements, the plurality of CTE statements including at least one nested CTE statement;
   flattening the plurality of CTE statements to generate a flattened SQL script;
   materializing at least one of the plurality of CTE statements to generate a materialized SQL script; and
   executing the materialized SQL script via a query engine.

10. The non-transitory computer-readable storage medium of claim 9,
    wherein flattening the plurality of CTE statements comprises:
       parsing the SQL script to build a hierarchal representation of the SQL script; and
       traversing the hierarchal representation to flatten the CTE statements included in the SQL script.

11. The non-transitory computer-readable storage medium of claim 10, the steps further comprising renaming one or more of the plurality of CTE statements.

12. The non-transitory computer-readable storage medium of claim 11, wherein renaming the one or more of the plurality of CTE statements comprises renaming the one or more of the plurality of CTE statements upon detecting a name collision.

13. The non-transitory computer-readable storage medium of claim 9, wherein materializing at least one of the plurality of CTE statements comprises analyzing names associated with the plurality of CTE statements to identify the at least one of the plurality of CTE statements to materialize.

14. The non-transitory computer-readable storage medium of claim 13, wherein analyzing names comprises determining if a name of the at least one of the plurality of CTE statements includes a predefined prefix.

15. The non-transitory computer-readable storage medium of claim 9, wherein materializing at least one of the plurality of CTE statements comprises converting the at least one of the plurality of CTE statements to a Create Table as Select (CTAS) statement.

16. The non-transitory computer-readable storage medium of claim 9, wherein executing the materialized SQL script via a query engine comprises:
 identifying a base query in the SQL script;
 parking statements of the SQL script;
 materializing the base query;
 rewriting the statements of the SQL script to utilize the base query, creating an optimized SQL script; and
 executing the optimized SQL script via the query engine.

17. A device comprising:
 a processor; and
 a storage medium for tangibly storing thereon logic for execution by the processor, the logic comprising instructions for:
  receiving a structured query language (SQL) script, the SQL script including a plurality of Common Table Expression (CTE) statements, the plurality of CTE statements including at least one nested CTE statement,
  flattening the plurality of CTE statements to generate a flattened SQL script,
  materializing at least one of the plurality of CTE statements to generate a materialized SQL script, and
  executing the materialized SQL script via a query engine.

18. The device of claim 17, wherein flattening the plurality of CTE statements comprises:
 parsing the SQL script to build a hierarchal representation of the SQL script;
 traversing the hierarchal representation to flatten the CTE statements included in the SQL script; and
 renaming one or more of the plurality of CTE statements upon detecting a name collision.

19. The device of claim 17, wherein materializing at least one of the plurality of CTE statements comprises:
 analyzing names associated with the plurality of CTE statements to identify the at least one of the plurality of CTE statements to materialize upon determining that a name of the at least one of the plurality of CTE statements includes a predefined prefix; and
 converting the at least one of the plurality of CTE statements to a Create Table as Select (CTAS) statement.

20. The device of claim 17, wherein executing the materialized SQL script via a query engine comprises:
 identifying a base query in the SQL script;
 parking statements of the SQL script;
 materializing the base query;
 rewriting the statements of the SQL script to utilize the base query, creating an optimized SQL script; and
 executing the optimized SQL script via the query engine.

* * * * *